United States Patent [19]

Chambrette et al.

[11] Patent Number: 5,098,574
[45] Date of Patent: Mar. 24, 1992

[54] MEMBRANE PURIFICATION OF SOLUTIONS/SUSPENSIONS OF POLYPHOSPHAZENES

[75] Inventors: Jean-Paul Chambrette, Billere; Daniel Morin, Orthiez; Jose L. Orozco, Lons; Philippe Potin, Billere, all of France

[73] Assignee: Atochem, Puteaux, France

[21] Appl. No.: 654,694

[22] Filed: Feb. 13, 1991

[30] Foreign Application Priority Data

Feb. 13, 1990 [FR] France .................. 90 01690

[51] Int. Cl.$^5$ ............................................. B01D 61/00
[52] U.S. Cl. ................................. 210/651; 210/653; 210/654; 525/538; 528/167; 528/168
[58] Field of Search ............. 210/651, 650, 653, 654, 210/500.21, 500.27, 500.28; 525/538; 526/179; 528/167, 168; 524/881

[56] References Cited

U.S. PATENT DOCUMENTS

| | | | |
|---|---|---|---|
| 4,289,862 | 9/1981 | Hornbaker et al. | 525/538 |
| 4,514,550 | 4/1985 | Penton | 528/167 |
| 4,558,103 | 12/1985 | Hergenrother et al. | 528/168 |
| 4,656,246 | 4/1987 | Chang et al. | |
| 4,663,420 | 5/1987 | Chang | 528/168 |
| 4,880,905 | 11/1989 | Ueyama et al. | 525/538 |
| 4,889,910 | 12/1989 | Bordere et al. | 525/538 |
| 5,001,203 | 3/1991 | DePoortere et al. | 525/538 |

FOREIGN PATENT DOCUMENTS 737412  6/1980  U.S.S.R. ........................... 528/167

*Primary Examiner*—Robert A. Dawson
*Assistant Examiner*—Ana Fortuna
*Attorney, Agent, or Firm*—Burns, Doane, Swecker & Mathis

[57] ABSTRACT

Impure solutions or suspensions of the polyphosphazenes, e.g., those containing the reagents and/or by-products of the chloro-substitution of a polydichlorophosphazene, are purified by contacting such impure solutions/suspension with a semipermeable membrane having a cutoff threshold corresponding to the impurities sought to be removed, and filtering such impurities therethrough, e.g., by establishing a trans-membrane pressure gradient.

23 Claims, 1 Drawing Sheet

MEMBRANE PURIFICATION OF SOLUTIONS/SUSPENSIONS OF POLYPHOSPHAZENES

BACKGROUND OF THE INVENTION

1. Field of the Invention

The present invention relates to the purification of solutions or suspension of impure polyorganophosphazenes.

2. Description of the Prior Art

The polyorganophosphazenes are known polymers comprising a plurality of recurring structural units of the formula:

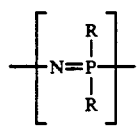

in which the symbols R, which may be identical or different in the same recurring unit or in different recurring units, are advantageously alkyl, aryl, alkoxy, fluoroalkoxy, aryloxy, alkyl- or arylsulfide, or alkyl- or arylamino radicals.

The polymers of formula (I) will be referred to hereinafter as polyorganophosphazenes or, more simply, as polyphosphazenes.

These polymers are prepared by substituting the chlorine atoms of polydichlorophosphazenes with nucleophilic reagents according to the following reaction:

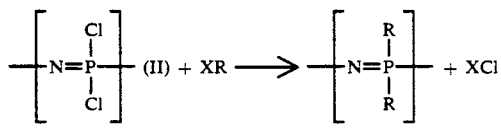

wherein X is a hydrogen atom or an alkali metal and R is as defined above.

This substitution reaction is carried out in solution and, in order to assure complete conversion, the operation is generally carried out in the presence of an agent that is nucleophilic relative to the chlorine atom to be substituted. The separation of these polymers in the pure state thus entails the elimination of the solvent, the excess reagents and the metallic salts of the nucleophilic agents after substitution.

For the elimination of metallic salts, and more particularly the elimination of NaCl, an extraction process comprising washing with water (JP 59/45,324) or using a mixture of isopropanol and water (U.S. Pat. No. 4,576,806) is known to this art. Such a process is obviously not applicable in the case of a water-soluble polyphosphazene.

To eliminate the solvent and the excess reagents, one such method entails precipitating the polymers by pouring a solution thereof into a precipitating liquid and repeating this operation until the desired purity is attained (H. R. Allcock et al, Inorg. Chem., 5 (10), 1709 (1966). This process requires the use of at least two types of solvents, which subsequently have to be separated, and which becomes increasingly expensive with increasing volumes to be treated, in order to provide complete purification. Furthermore, as the most common physical state of polyphosphazene is that of a gum, it is generally not possible to simply conduct the operation in a conventionally agitated reactor, as the recovery of the gum, which often is adhesive, is very difficult.

In published French Application No. 87/14,215, a method is described which includes the distillation of the solvent directly in a heated mixer, optionally in a vacuum, and washing the polyphosphazene by comminution in the presence of a nonsolvent for the polymer.

In the particular case of the polyaryloxyphosphazenes, a process for the elimination of excess phenols is described in U.S. Pat. No. 4,789,728. It entails washing the polymer in solution in cyclohexane, with a hydroalcohol solution of sodium hydroxide. This process frequently gives rise to emulsions and makes it necessary to separate the phenols and the alcohol prior to discharging the water.

SUMMARY OF THE INVENTION

Accordingly, a major object of the present invention is the provision of an improved process for the purification of solutions or suspensions of the polyphosphazenes, whereby all impurities soluble in the solvent of the polymer proper are either partially or totally eliminated, at least to a content by weight of less than a certain level. Thus, for example, in the case of a polyphosphazene soluble in an aqueous medium, it is possible to eliminate sodium or ammonium chlorides and water-soluble excess reagents, such as certain amines, glycols or polyethers. In the case of a polyphosphazene soluble in a hydrocarbon, the process of the invention permits eliminating excess reagents in such hydrocarbon.

Another object of this invention is the provision of an improved process for the purification of a polyphosphazene that is insoluble both in an aqueous and an organic medium, while the polymer itself may be converted into a suspension or a gel that can be transported, for example, by pumping.

Yet another object of this invention is the provision of a novel process for the partial precondensation of a solution or suspension of a polyphosphazene emanating from a substitution reactor.

Briefly, the present invention features contacting a dissolved or suspended polyorganophosphazene, in particular containing substitution reagents and/or products emanating from such substitution, with a semipermeable membrane, the cutoff threshold of which corresponds to the impurities or products to be eliminated, and to eliminate said reagents and/or products by permeation through said membrane under the influence of a trans-membrane pressure gradient.

DETAILED DESCRIPTION OF THE PREFERRED EMBODIMENTS OF THE INVENTION

Figure 1:
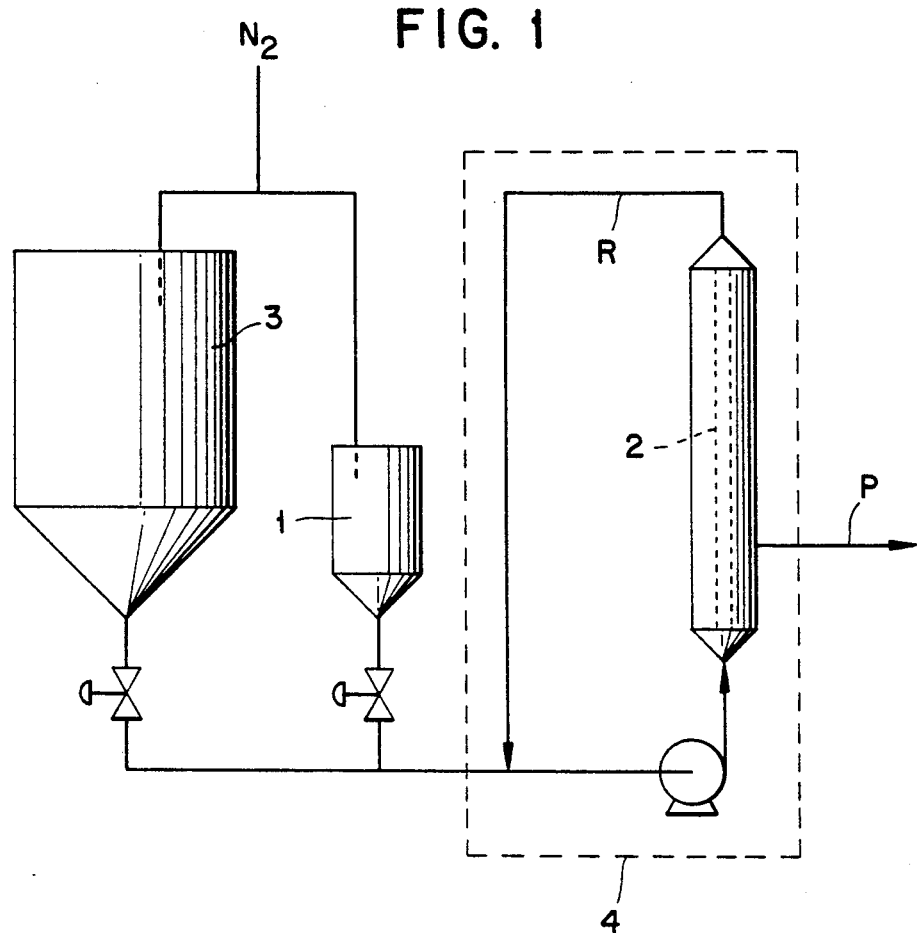
FIG. 1 is a schematic/diagrammatic illustration of one embodiment of the membrane purification according to the present invention.

More particularly according to the present invention, the trans-membrane passage of the aforementioned impurities may be attained by the application of pressure to the side thereof of the solution or suspension to be treated and/or by creating a partial vacuum on the permeate side. Exemplary of such pressure gradients, the relative pressure on the solution side is typically on the order of $5 \times 10^4$ to $2 \times 10^6$ Pa and preferably $10^5$ to $10^6$ Pa, with the absolute pressure on the permeate side ranging from $10^3$ to $10^5$ Pa.

In order to avoid an accumulation of polymers on the surface of the membrane, it is advantageous to circulate the solution to be treated in an essentially tangential manner relative to the surface of said membrane.

The semipermeable membranes may be selected from a wide variety of materials, this selection essentially being determined by the physical and chemical stability of the membrane in contact with the solution/suspension to be treated and by the cutoff zone desired for the operation of purification. The membranes may be in the form of tubes, hollow fibers, flat or helical membranes, and the like.

Also, the membranes may be fabricated from organic or inorganic materials.

Exemplary of such inorganic materials, particularly representative are porous metals and alloys of porous metals, such porous metals typically comprising sintered metals; porous carbon, the surface of which is coated, for example, with a thin layer of zirconium oxide, aluminum oxide or silicon oxide; porous glass; ceramics which also may have a coating of aluminum oxide, for example, with the aluminum oxide optionally being coated with zirconium oxide.

Exemplary of such organic materials, particularly representative are the natural and synthetic polymers, including their mixtures and alloys, both thermoplastic and thermosetting. Among these polymers, illustrative are the polysulfones; the polystyrenes, including copolymers of styrene, for example with acrylonitrile and/or butadiene; the polycarbonates; the cellulosic polymers; the polyamides and polyimides, including the aromatic polyamides and polyimides; the polyethers; the polyarylethers such as polyphenylene oxides; the polyesters, including the terephthalates and the polyacrylates and polymethacrylates; the polysulfides; polymers derived from olefinically unsaturated monomers other than those indicated above, such as polyethylene, polypropylene, (poly-1-butene), poly(4-methyl-1-pentene); the vinyl polymers, such as polyvinylchloride, polyvinylfluoride, polyvinylidenechloride, poly(vinyl esters); and the polyphosphazenes, etc.

In general, the membranes in the form of hollow fibers have an external diameter ranging from about 25 to about 2,500 μm and a wall thickness ranging from about 2 to about 50 μm, with the walls of said fibers being permeated by pores having diameters of a size generally less than 2 μm and preferably less than 0.1 μm.

The flat or tubular membranes have a filtering wall thickness ranging from about 30 μm to about 500 μm.

The preparation of the flat, tubular of hollow fiber membranes indicated above is per se known to this art and is described in the literature. Compare, for example, Kirk-Othmer, "Hollow Fiber Membrane", *Ency. of Chem. Tachn.*, 12 3rd Edition, 492-517 (1980); "Membranes"; *Ency. of Pol. Sc. & Eng.*, 9, 2nd Edition, pp. 509-579 (1987).

As indicated above, the selection of one or another membrane configurations, together with that of their material, will take account of both the strength of the membrane in the medium it is in contact with and the molecular weight of the material it is adopted to transport. Thus, if the purpose is merely to eliminate the excess nucleophilic agents and/or the dissolved salts resulting from the substitution reaction and/or the solvents and/or the catalysts used in such reaction, membranes may be selected, the cutoff threshold of which is about 1,000 to 5,000 Daltons (g/mole). If, on the other hand, it is also desired to eliminate oligomers or low molecular weight polymers, membranes may be used with much higher cutoff thresholds of up to 50,000 Daltons, or more. In general, a cutoff threshold on the order of 5,000 to 15,000 Daltons is especially suitable for the solutions or suspensions to be purified.

The process according to the invention comprises contacting the impure solution or suspension to be purified with the semipermeable membrane and the elimination of impurities by their permeation through said membrane.

In view of the elimination of a fraction of the solvent together with the impurities, additional solvent is injected into the polyphosphazene solution to be purified.

In one embodiment of the process of the invention, the polyphosphazene solution may be initially subjected to a preconcentration in order to reduce the volume of the solvent required for washing the impurities.

The process of the invention may advantageously be carried out according to one of the following embodiments:

In a first embodiment, following the aforementioned preconcentration phase, which nonetheless remains optional, the polyphosphazene solution or suspension to be purified is introduced into the permeation cell, the permeate collected on one side of the semipermeable membrane and the retained materials recycled in a permeation loop supplied with the solution or suspension to be treated and a new solvent. This embodiment is illustrated in FIG. 1.

In a second embodiment, the retentate is directly recycled into the vessel containing the solution or suspension to be purified, simultaneously with the addition of the new solvent. This second embodiment is illustrated in FIG. 2.

Figure 2:
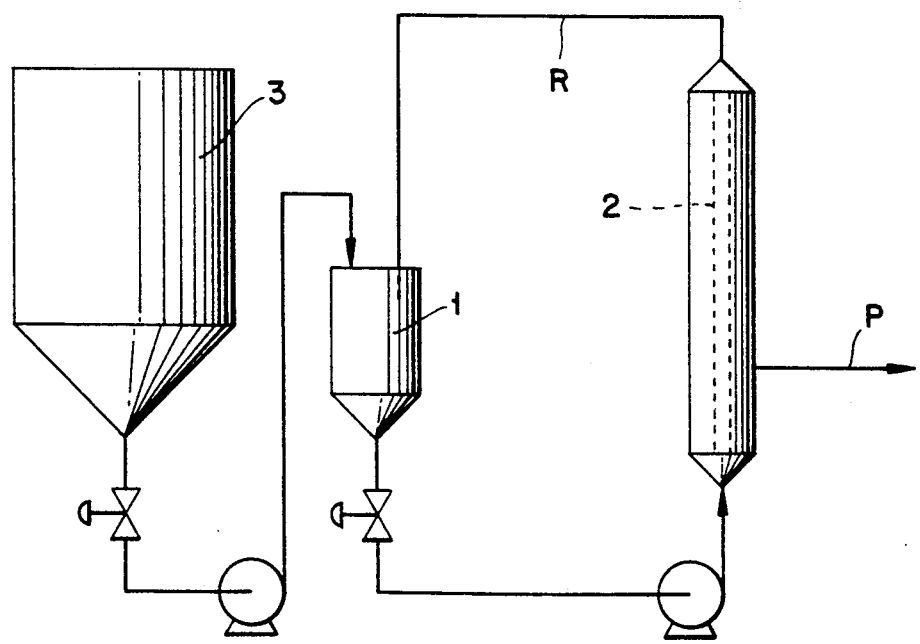
FIG. 2 is a schematic/diagrammatic illustration of another embodiment of the membrane purification according to the invention.

In the FIGS. 1 and 2, the several symbols have the following significance:

(1) designates the polymer solution to be purified,
(2) designates the semipermeable membrane,
(3) designates the new solvent,
(4) designates the permeation loop (FIG. 1),
(P) designates the permeate,
(R) designates the retained material.

In these two embodiments, the passage of the solution or suspension to be purified onto or into the membrane (depending on whether a flat, tubular or hollow fibers membrane is used) may be repeated until both the degree of purity and, by varying the amount of fresh solvent injected, the concentration desired, are attained.

The solvent contained in the permeate may optionally be recycled as the solvent proper, by distillation.

If a discontinuous permeation in a single stage is carried out, with the volume of the polymer solution or suspension remaining constant and equal to that of the permeation loop, the impurity concentration will decrease approximately exponentially with the volume of permeate collected, in accordance with a law of the type $C = C_o \exp(-V_p/V_b)$ wherein C is the impurity concentration in the retentate, $C_o$ is the impurity concentration in the retentate at the onset of filtration, $V_p$ is the volume of permeate collected, and Vb is the volume of the permeation loop.

It is also possible to carry out a multistage discontinuous permeation. In this event, the initial solution/suspension is purified in the loop of a first stage by means of the permeate of the loop of a second stage. When the initial solution/suspension of the polyphosphazene has attained a certain degree of purity, it is transferred into the loop of the second stage, where it is purified to a certain degree by means of the permeate of a third stage, and so forth. This technique requires a new solvent at the last stage only, and only the permeate from the first stage is transferred to an evaporator for the recycling of the solvent.

In a variation of this technique, the discontinuous operation is replaced by a multistage continuous process. In this event, the polyphosphazene solution/suspension is continuously transferred from one stage to the other and the permeate circulates in the same manner from the last stage to the first. This type of operation makes it possible to control the degree of purification by altering the input flow rate of solution/suspension to be purified in the loop of the first stage and the input flow rate of pure solvent into the loop of the last stage.

The permeation is discontinued when the intended impurity concentration is attained. The solvent of the retentate may then be eliminated, for example by evaporation, such as to provide the final purified polymer.

The process according to the invention is applicable to the purification, optionally combined with the concentration, of solutions or suspension of polyphosphazenes, regardless of the process used to prepare said polyphosphazenes or polydichlorophosphazenes from which they are derived by substitution as described above. It is especially suitable for the purification of polyphosphazenes emanating from the polydichlorophosphazenes prepared via the two principal processes described in U.S. Pat. No. 3,370,020 and EP 026,685.

It is applicable to the different polyphosphazenes of formula (I) derived from polydichlorophosphazenes and, more particularly, to polyphosphazenes of formula (I) bearing alkoxy or fluoroalkoxy substituents, or aryloxy and particularly phenoxy substituents.

The process of the invention presents a conspicuous array of advantages, in particular:

(a) it makes it possible to eliminate the impurities rapidly and as completely as is desired;

(b) it is not accompanied by any mechanical or thermal degradation of the polyphosphazene, which remains in solution or suspension, and the purification thereof may be carried out at temperatures lower than those causing degradation of the polymer;

(c) it makes it possible, by the appropriate selection of the membrane, to eliminate the oligomers and thus to increase the average molecular weight of the final polymer and to reduce its polydispersity;

(d) it reduces the consumption of energy in the preconcentration of the polymer solution; and (e) it is substantially insensitive to variations in the quality of the product to be treated, whether it involves the polymer itself and, in particular, the substituents thereof, or the solvent of the solution or suspension, or the initial concentration of such solution or suspension.

In order to further illustrate the present invention and the advantages thereof, the following specific examples are given, it being understood that same are intended only as illustrate and in nowise limitative.

In said examples to follow, a polyphosphazene substituted by different phenols in the following distribution, was used (molar percentages):

(i) 11.3% groups derived from o-allylphenol;
(ii) 37.3% groups derived from p-sec-butylphenol;
(iii) 51.4% groups derived from p-methoxyphenol.

Also in said examples to follow, the membranes employed were tubular membranes of porous carbon coated on the inside with a thin layer of zirconium oxide. These membranes, which displayed a cutoff threshold of 10,000 Daltons, were tubes having an internal diameter of 6 mm and an external diameter of 10 mm. The surface area of such membranes was $7.54 \times 10^{-3}$ m$^2$ for Examples 1, 2 and 3 (use of a 20 cm long tubular membrane) and 0.316 m$^2$ for Example 4 (two bundles of 7 tubes having a length of 1.20 m). The transmembrane pressure was approximately $3.5 \times 10^5$ Pa and the speed of circulation was on the order of 2 m/s. The solvent was toluene. The apparatus employed was that shown in FIG. 1.

EXAMPLE 1

245 g of a neutralized and filtered substitution solution was introduced into the polyphosphazene reservoir. The composition of the solution was (by weight):

| (i) Substituted polymer | 10% |
|---|---|
| (ii) Orthodichlorobenzene (ODCB) | 14.2% |
| (iii) o-allylphenol | 0.39% |
| (iv) p-sec-butylphenol | 1.1% |
| (v) p-methoxyphenol | 0.55% |
| (vi) Toluene | 74%. |

A preconcentration was carried out over 3 hours, 20 min, after which the weight of the polymer solution had been reduced to 84.1 g, all of which being situated in the permeation loop.

Following the concentration phase, the permeation loop was supplied with pure toluene to compensate for the permeate volume eliminated. The temperature was controlled at 30°.

After 11 hours, 50 min, 764 g of the permeate were collected. In the final retentate, the polymer concentration was 29% and the phenols could not be determined by GPG (gas phase chromatography) (concentration less than 0.001%). The final ODCB content was 0.02%.

This example demonstrates the fact that the elimination of the phenols and the ODCB was quantitative.

Again by GPC, an increase in the weight-average molecular weight from 336,000 to 386,000 was determined, together with a reduction of the polydispersity index from 38 to 6. This was due to the elimination of oligomers having a molecular weight less than 10,000 from the permeate and to the fact that there was no degradation of the polymer over the course of the operation.

EXAMPLE 2

In this example, the initial concentrations in phenols and ODCB were higher than those of Example 1. The solution (190 ml at the outset) was concentrated by permeation of from 9% to 20% of polymer, then washed with 180 ml toluene. The following results were obtained:

|  | Initial solution (%) by weight | Concentrated solution (%) by weight |
| --- | --- | --- |
| Polymer (>10,000) | 9 | 20 |
| Oligomer (<10,000) | 4 | trace amounts |
| ODCB | 17.5 | 2.2 |
| p-methoxyphenol | 3.7 | 0.57 |
| p-sec-butylphenol | 2.3 | 0.32 |
| o-allylphenol | 0.37 | 0.05 |
| Toluene | qsp 100.00% | qsp 100.00% |

This example well illustrates the elimination of oligomers having a molecular weight less than 10,000, as well as a great reduction in the content of phenolic residues of substitution.

EXAMPLE 3

In this example, TCB (1,2,4-trichlorobenzene replaced the ODCB.

|  | Initial solution (%) by weight | Solution concentrated twice and washed with 900 g toluene (%) by weight |
| --- | --- | --- |
| Polymer | 9.4% | 16% |
| TCB | 31% | 0.45% |
| o-Allylphenol | 0.24% | 0.0055% |
| p-Methoxyphenol | 1.03% | 0.017% |
| p-Sec-butylphenol | 0.97% | 0.0221% |
| Toluene | qsp 100% | qsp 100% |

EXAMPLE 4

The apparatus comprised the same type of membrane as indicated above, but placed in two modules, each providing 0.158 m² of surface area, a total of 0.316 m².

The solution to be purified had the following composition (weight percentages):

| (i) Polyphosphazene (identical with that of Example 1) | 12.1% |
| --- | --- |
| (ii) 1,2,4-Trichlorobenzene | 17% |
| (iii) o-Allylphenol | 0.170% |
| (v) p-Methoxyphenol | 0.254% |
| (v) p-Sec-butylphenol | 0.384 |
| (vi) Toluene | qsp. |

This solution was introduced into the loop under a mean pressure of 2 bars. In this manner, the concentration in polyphosphazene in the loop was increased to 21.5% and the weight of the solution was then 7.1 kg.

Subsequently, pure toluene was added at 30° C. to the permeation loop. The mean pressure applied to the membranes was 3 bars. Samples were taken over the course of the purification. The following Table reports the decrease in the concentration to be eliminated as a function of the amounts of toluene introduced into the loop.

| Toluene in 1 | TCB in % | PHENOLS IN PPM | | |
| --- | --- | --- | --- | --- |
| | | ALLYL | 2 METHOXY | BUTYL |
| 0 | 17,00 | 1,700 | 2,540 | 3,840 |
| 4 | 9,20 | 970 | 1,520 | 2,280 |
| 6 | 6,90 | 740 | 1,140 | 1,700 |
| 8 | 4,50 | 500 | 820 | 1,200 |
| 10 | 2,95 | 350 | 580 | 830 |
| 12 | 1,90 | 235 | 390 | 540 |
| 14 | 1,30 | 160 | 280 | 390 |
| 16 | 0,85 | 110 | 200 | 260 |
| 18 | 0,58 | 80 | 140 | 170 |

At the end of the operations, the analysis of the solution treated and of the permeate indicated that 80% of the polyphosphazene was recovered in the solution treated and 20% in the permeate; 90% of the fraction contained in the permeate had molecular weights of less than 10,000, expressed in terms of polystyrene equivalents.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the purification of an impure solution or suspension of a polyorganophosphazene, comprising contacting such impure polyorganophosphazene solution or suspension with a semipermeable membrane having a cutoff threshold corresponding to the impurities sought to be removed, and filtering such impurities therethrough.

2. The process as defined by claim 1, said impure solution or suspension comprising the reagents and/or byproducts of the chloro-substitution of a polydichlorophosphazene.

3. The process as defined by claim 2, comprising filtering such impurities through said membrane by establishing a trans-membrane pressure gradient.

4. The process as defined by claim 3, comprising applying a positive pressure to the polyphosphazene solution or suspension side of said membrane.

5. The process as defined by claim 3, comprising creating a partial vacuum on the permeate side of said membrane.

6. The process as defined by claim 4, said positive pressure ranging from $5 \times 10^4$ to $2 \times 10^6$ Pa.

7. The process as defined by claim 6, said positive pressure ranging from $10^5$ to $10^6$ Pa.

8. The process as defined by claim 3, wherein the absolute pressure on the permeate side of said membrane ranges from $10^3$ to $10^5$ Pa.

9. The process as defined by claim 3, comprising conveying said impure solution or suspension of polyphosphazene onto or into said semipermeable membrane, recovering permeate from one face surface thereof, and recycling retentate into a permeation loop to again contact same with said membrane.

10. The process as defined by claim 3, comprising conveying said impure solution or suspension of polyphosphazene onto or into said semipermeable membrane, recovering permeate from one face surface thereof, and recycling retentate directly back into the supply of impure polyphosphazene.

11. The process as defined by claim 1, comprising tangentially contacting such impure polyphosphazene solution or suspension with said semipermeable membrane.

12. The process as defined by claim 1, said semipermeable membrane comprising a flat, tubular or hollow fiber membrane, or a composite comprising a membrane film secured onto a hollow fiber substrate.

13. The process as defined by claim 1, said semipermeable membrane comprising a porous metal or alloy thereof, porous carbon, porous glass, a ceramic or aluminum oxide.

14. The process as defined by claim 1, said semipermeable membrane comprising tubularly shaped porous carbon provided with a coating of zirconium oxide.

15. The process as defined by claim 1, said semipermeable membrane comprising a natural or synthetic polymer, or mixture or alloy thereof.

16. The process as defined by claim 1, said semipermeable membrane comprising hollow fibers having an external diameter ranging from about 25 to about 2,500 $\mu$m and a wall thickness ranging from about 2 to about 50 $\mu$m.

17. The process as defined by claim 1, said semipermeable membrane being flat or tubular and having a thickness ranging from about 30 to about 500 $\mu$m.

18. The process as defined by claim 1, said semipermeable membrane having a cutoff threshold ranging from 1,000 to 50,000 Daltons.

19. The process as defined by claim 18, said cutoff threshold ranging from 5,000 to 15,000 Daltons.

20. The process as defined by claim 1, carried out discontinuously.

21. The process as defined by claim 1, carried out continuously.

22. The process as defined by claim 20, comprising a multistage purification.

23. The polyphosphazene product of the process as defined by claim 1.

* * * * *